(12) United States Patent
Rahimi et al.

(10) Patent No.: US 10,583,324 B2
(45) Date of Patent: Mar. 10, 2020

(54) EXPLICIT PREDICTION OF ADVERSARY MOVEMENTS WITH CANONICAL CORRELATION ANALYSIS

(71) Applicant: HRL Laboratories, LLC, Malibu, CA (US)

(72) Inventors: Amir M. Rahimi, Malibu, CA (US); Soheil Kolouri, Calabasas, CA (US); Rajan Bhattacharyya, Sherman Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 15/943,662

(22) Filed: Apr. 2, 2018

(65) Prior Publication Data

US 2018/0290019 A1    Oct. 11, 2018

Related U.S. Application Data

(60) Provisional application No. 62/482,635, filed on Apr. 6, 2017.

(51) Int. Cl.
*A63B 24/00* (2006.01)
*G06K 9/00* (2006.01)
*G06K 9/62* (2006.01)

(52) U.S. Cl.
CPC ...... *A63B 24/0021* (2013.01); *G06K 9/00335* (2013.01); *G06K 9/6223* (2013.01); *A63B 2024/0025* (2013.01); *A63B 2024/0028* (2013.01); *A63B 2024/0056* (2013.01)

(58) Field of Classification Search
CPC ........ A63B 24/0021; A63B 2024/0025; A63B 2024/0056
See application file for complete search history.

(56) References Cited

U.S. PATENT DOCUMENTS

| | | | |
|---|---|---|---|
| 2011/0013087 A1* | 1/2011 | House | A63B 24/0021 348/564 |
| 2015/0142716 A1* | 5/2015 | Lucey | G06N 5/022 706/46 |

OTHER PUBLICATIONS

Jaime Sampaio, "Exploring Game Performance in the National Basketball Association Using Player Tracking Data." https://journals.plos.org/plosone/article?id=10.1371/journal.pone.0132894. Jul. 14, 2015.*

(Continued)

*Primary Examiner* — Reginald A Renwick
(74) *Attorney, Agent, or Firm* — Tope-McKay & Associates

(57) ABSTRACT

Described is a system for prediction of adversary movements. In an aspect, the system includes one or more processors and a memory, the memory being a non-transitory computer-readable medium having executable instructions encoded thereon, such that upon execution of the instructions, the one or more processors perform operations of computing relative positions of multiple objects of interest, generating a feature representation by forming a matrix based on the relative positions, predicting movement of the multiple objects of interest by applying clustering to the feature representation and by performing canonical correlation analysis, and controlling a device based on the predicted movement of the multiple objects of interest.

21 Claims, 9 Drawing Sheets

(56) References Cited

OTHER PUBLICATIONS

Lucey, Patrick, et al. "Representing and discovering adversarial team behaviors using player roles." Proceedings of the IEEE Conference on Computer Vision and Pattern Recognition. 2013, pp. 2704-2713.
Ali, Saad, and Mubarak Shah. "Floor fields for tracking in high density crowd scenes." European conference on computer vision. Springer Berlin Heidelberg, 2008, pp. 1-14.
Pellegrini, Stefano, et al. "You'll never walk alone: Modeling social behavior for multi-target tracking." 2009 IEEE 12th International Conference on Computer Vision. IEEE, 2009, pp. 261-268.
Bialkowski, Alina, et al. "Recognizing team activities from noisy data." Proceedings of the IEEE Conference on Computer Vision and Pattern Recognition Workshops. 2013, pp. 984-990.
Bialkowski, Alina, et al. "Person re-identification using group information." International Conference on Digital Image Computing, Techniques and Applications (DICTA), IEEE, 2013, pp. 1-6.
Intille, Stephen S., and Aaron F. Bobick. "A framework for recognizing multi-agent action from visual evidence." AAAI/IAAI 99 (1999): pp. 518-525.
Li, Ruonan, Rama Chellappa, and Shaohua Kevin Zhou. "Learning multi-modal densities on discriminative temporal interaction manifold for group activity recognition." Computer Vision and Pattern Recognition, 2009. CVPR 2009. IEEE Conference on. IEEE, 2009, pp. 2450-2457.
Li, Ruonan, and Rama Chellappa. "Group motion segmentation using a spatio-temporal driving force model." Computer Vision and Pattern Recognition (CVPR), Conference on., IEEE, 2010, pp. 2038-2045.
9. Wang, Xinchao, et al. "Tracking interacting objects optimally using integer programming." European Conference on Computer Vision. Springer International Publishing, 2014, pp. 17-32.
Bialkowski, Alina, et al. "Win at home and draw away": automatic formation analysis highlighting the differences in home and away team behaviors. Proceedings of 8th Annual Mit Sloan Sports Analytics Conference. 2014, pp. 1-7.
Tran, Du, and Junsong Yuan. "Optimal spatio-temporal path discovery for video event detection." IEEE Conference on Computer Vision and Pattern Recognition (CVPR), IEEE, 2011, pp. 3321-3328.
Hardoon, David R., Sandor Szedmak, and John Shawe-Taylor. "Canonical correlation analysis: An overview with application to learning methods." Neural computation 16.12 (2004): pp. 2639-2664.
Kim, Kihwan, et al. "Motion fields to predict play evolution in dynamic sport scenes." Conference on Computer Vision and Pattern Recognition (CVPR), IEEE, 2010, pp. 840-847.
Pedregosa et al., "2.3. Clustering," Scikit-learn: Machine Learning in Python, JMLR 12, pp. 2825-2830, 2011, 2.3. Clustering—Scikit-learn 0.19.1, Documentation, Mar. 18, 2018, scikit-learn.org/stable/modules/clustering.html.
Calinski, T., & Harabasz, J. "A dendrite method for cluster analysis". Communications in Statistics-theory and Methods 3: pp. 1-27 (1974).
Notification of Transmittal of International Search Report and the Written Opinion of the International Searching Authority for PCT/US2018/025770; dated Jul. 27, 2018.
International Search Report of the International Searching Authority for PCT/US2018/025770; dated Jul. 27, 2018.
Written Opinion of the International Searching Authority for PCT/US2018/025770; dated Jul. 27, 2018.
Tae-Kyun Kim, et. al., "Tensor Canonical Correlation Analysis for Action Classification," Computer Vision and Pattern Recognition, 2007, IEEE, pp. 1-8.
Notification of International Preliminary Report on Patentability Chapter I for PCT/US2018/025770; dated Oct. 17, 2019.
International Preliminary Report on Patentability Chapter I for PCT/US2018/025770; dated Oct. 17, 2019.

* cited by examiner

Algorithm 1 Explicit Tactical Analysis in Basketball

Input: Positions $x_k$, $y_k$, $x_{ball}$, $y_{ball}$
  where $k \in \{player_1, ..., player_5\}$
Output: $CCA_{comp}$
for all events n do

1. Generate the trajectories $hpos_m^n$, $vpos_m^n$:
  $[x_1^h - x_{ball}, y_1^h - y_{ball}, ..., x_5^h - x_{ball}, y_5^h - y_{ball}, x_{ball}, y_{ball}]$
  $[x_1^v - x_{ball}, y_1^v - y_{ball}, ..., x_5^v - x_{ball}, y_5^v - y_{ball}, x_{ball}, y_{ball}]$
    $n$: event index, $n \in \{1, ..., N\}$
    $m$: sample index within event $n$, $m \in \{1, ..., M\}$ 2. Generate pairs of tactical feature vectors $\mathbf{h}_n, \mathbf{v}_n$ $H_n = \begin{bmatrix} hpos_1^n \\ \vdots \\ hpos_M^n \end{bmatrix} \rightarrow \mathbf{h}_n = vec(H_n)$ $V_n = \begin{bmatrix} vpos_1^n \\ \vdots \\ vpos_M^n \end{bmatrix} \rightarrow \mathbf{v}_n = vec(V_n)$ 3. CCA:
  $CCA_{comp} = \underset{\mathbf{u},\mathbf{w}}{\mathrm{argmax}} \frac{\mathbf{u}^T C_{hv} \mathbf{w}}{\sqrt{\mathbf{u}^T C_{hh} \mathbf{u}} \sqrt{\mathbf{w}^T C_{vv} \mathbf{w}}}$
  where $C_{hv} = \sum_{n=1}^N \mathbf{h}_n \mathbf{v}_n^T$, $C_{hh} = \sum_{n=1}^N \mathbf{h}_n \mathbf{h}_n^T$, and $C_{vv} = \sum_{n=1}^N \mathbf{v}_n \mathbf{v}_n^T$ 4. Tactical Analysis with CCA:
  Let $U = [\mathbf{u}_1, ..., \mathbf{u}_k]$ and $W = [\mathbf{w}_1, ..., \mathbf{w}_k]$ be the top $k$ components of CCA, then for an input tactical feature vector $\mathbf{h}$ we can predict the opposing team's reaction $\mathbf{v}$ from:
  $\hat{\mathbf{v}} = W U^T \mathbf{h}$
end for

FIG. 6

EXPLICIT PREDICTION OF ADVERSARY MOVEMENTS WITH CANONICAL CORRELATION ANALYSIS

CROSS-REFERENCE TO RELATED APPLICATIONS

This application claims the benefit of and is a non-provisional patent application of U.S. provisional application No. 62/482,635, filed on Apr. 6, 2017, the entirety of which is hereby incorporated by reference.

BACKGROUND OF INVENTION

(1) Field of Invention

The present invention relates to prediction of adversary movements and, more specifically, to a system and method for control of a device based on explicit prediction of adversary movements.

(2) Description of Related Art

For some adversarial activities, rapid or real-time tactical feedback could be useful for improving performance of a team. Such high level analyses are typically complex, so team performance typically relies heavily on the skill set of coaches who can oversee the game from a wide perspective. Systems to predict adversarial behavior may thus be of assistance to coaches, players, spectators, and/or others.

Conventional systems have attempted to understand certain aspects of prediction of adversarial behavior, such as in sports. These aspects may include team behavior, player trajectories, group motion, player interaction, and formation analysis. However, each of the references below use simplifying assumptions that eliminate an important part of "tactical" behavior.

For example, Lucey et al. (see the List of Incorporated Literature References, Literature Reference No. 1) proposed a role-based representation in order to better understand the team behavior. Their approach can reduce the problem of high permutation in player movements.

In another approach, Intille et al. (see Literature Reference No. 6) modeled the interactions between player trajectories using a Bayesian network.

Multi-modal density function was used in Li et al. (see Literature Reference No. 7) to classify different offensive plays. In Li et al. (see Literature Reference No. 8), the authors segmented the group motion and used a spatio-temporal driving force model to identify offensive plays in American football.

In a sports setting, such as soccer, Kim et al. (see Literature Reference No. 13) estimated the global movement of the players using a dense motion field. They then looked for convergence of these motion fields to indicate the key events.

Wang et al. (see Literature Reference No. 9) formulated a network-flow to track all players simultaneously by considering interactions between players.

Formation analysis was used in Bialkowski et al. (see Literature Reference No. 10) to compare the performance of a team playing at home or away from home.

Given the limitations of each of these conventional systems, a continuing need exists for a system that also considers certain parts of tactical behavior.

SUMMARY OF INVENTION

This disclosure provides a system for predicting movements. In various embodiments, the system includes one or more processors and a memory, the memory being a non-transitory computer-readable medium having executable instructions encoded thereon, such that upon execution of the instructions, the one or more processors perform operations, including: computing relative positions of multiple objects of interest; generating a feature representation by forming a matrix based on the relative positions; predicting movement of the multiple objects of interest by applying clustering to the feature representation and by performing canonical correlation analysis; and controlling a device based on the predicted movement of the multiple objects of interest.

In another aspect, the device includes a display.

In another aspect, the device includes a motor.

In another aspect, the one or more processors further perform the operation of generating pairs of tactical feature vectors.

Further, in another aspect, the canonical correlation analysis is performed using the pairs of tactical feature vectors.

In another aspect, controlling the device includes causing a camera to orient based on the predicted movement.

In another aspect, the canonical correlation analysis (CCA) maximizes the following objective function:

$$CCA_{comp} = \arg\max_{u,w} \frac{\sum_{n=1}^{N}(u^T h_n)(v_n^T w)}{\sqrt{\sum_{n=1}^{N} u^T h_n h_n^T u} \sqrt{\sum_{n=1}^{N} w^T v_n v_n^T w}} = \arg\max_{u,w} \frac{u^T C_{hv} w}{\sqrt{u^T C_{hh} u} \sqrt{w^T C_{vv} w}}$$

wherein u and w are CCA components that project data onto a shared embedding and $C_{hh}$, $C_{vv}$, $C_{hv}$ are covariance matrices, the tactical formations of a home team and an adversary team are embedded into vectors h and v, respectively, N is the total number of tactical formations during a given time period, and the multiple objects of interest are the members of the adversary team.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 6 illustrates tactical prediction using Canonical Correlation Analysis, according to various embodiments;

DETAILED DESCRIPTION

Figure 1:
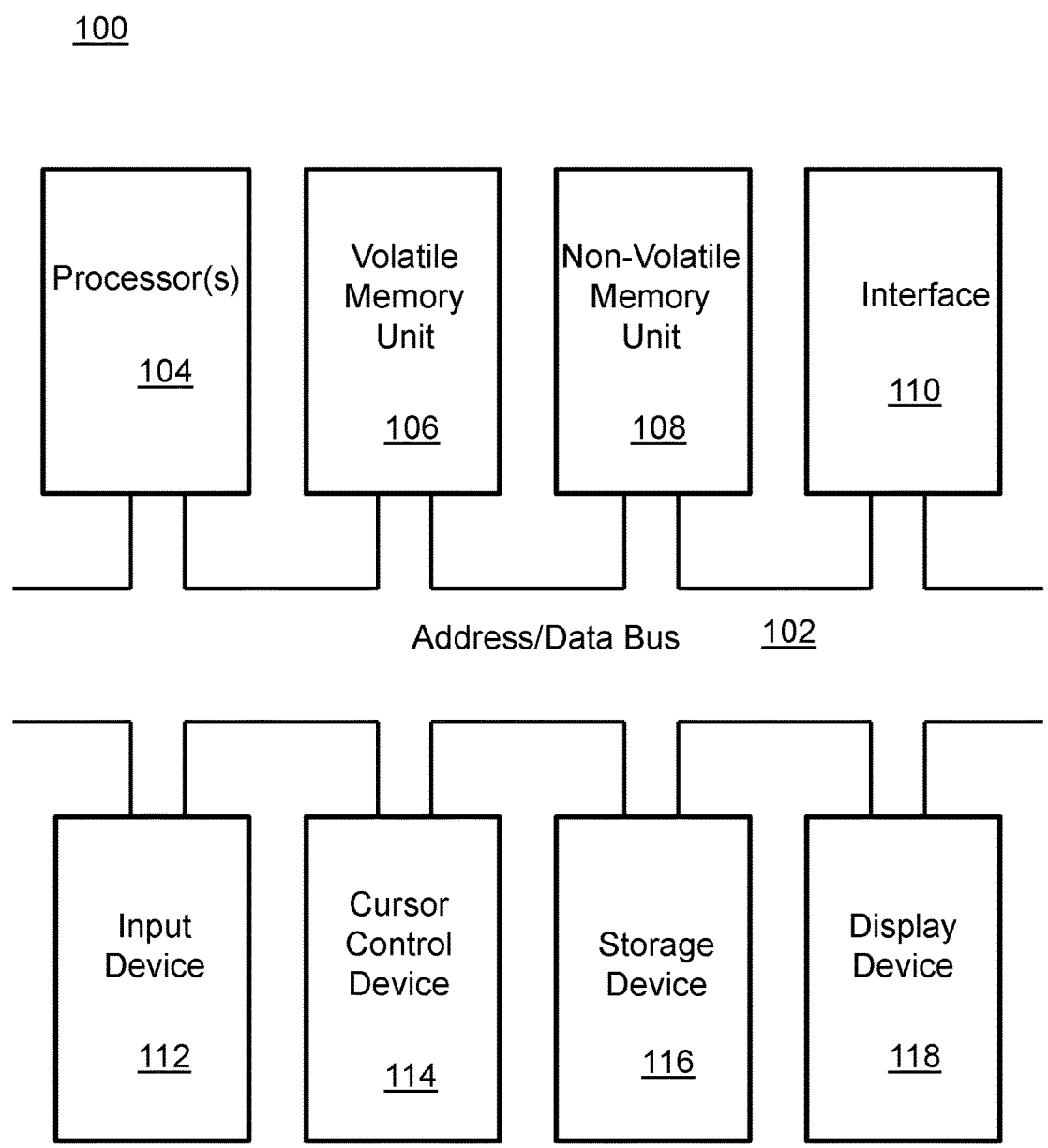
FIG. 1 is a block diagram depicting the components of a system, according to various embodiments.

The present invention relates to prediction of adversary movements and, more specifically, to a system and method for control of a device based on explicit prediction of adversary movements.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of incorporated literature references is provided as a central resource for the reader. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. Lucey, Patrick, et al. "Representing and discovering adversarial team behaviors using player roles." Proceedings of the IEEE Conference on Computer Vision and Pattern Recognition. 2013.
2. Ali, Saad, and Mubarak Shah. "Floor fields for tracking in high density crowd scenes." European conference on computer vision. Springer Berlin Heidelberg, 2008.
3. Pellegrini, Stefano, et al. "You'll never walk alone: Modeling social behavior for multi-target tracking." 2009 IEEE 12th International Conference on Computer Vision. IEEE, 2009.
4. Bialkowski, Alina, et al. "Recognizing team activities from noisy data." Proceedings of the IEEE Conference on Computer Vision and Pattern Recognition Workshops. 2013.
5. Bialkowski, Alina, et al. "Person re-identification using group information." International Conference on Digital Image Computing, Techniques and Applications (DICTA), IEEE, 2013.
6. Intille, Stephen S., and Aaron F. Bobick. "A framework for recognizing multi-agent action from visual evidence." AAAI/IAAI 99 (1999): 518-525.
7. Li, Ruonan, Rama Chellappa, and Shaohua Kevin Zhou. "Learning multi-modal densities on discriminative temporal interaction manifold for group activity recognition." Computer Vision and Pattern Recognition, 2009. CVPR 2009. IEEE Conference on. IEEE, 2009.
8. Li, Ruonan, and Rama Chellappa. "Group motion segmentation using a spatio-temporal driving force model." Computer Vision and Pattern Recognition (CVPR), 2010 IEEE Conference on. IEEE, 2010.
9. Wang, Xinchao, et al. "Tracking interacting objects optimally using integer programming." European Conference on Computer Vision. Springer International Publishing, 2014.
10. Bialkowski, Alina, et al. "Win at home and draw away": automatic formation analysis highlighting the differences in home and away team behaviors." Proceedings of 8th Annual MIT Sloan Sports Analytics Conference. 2014.
11. Tran, Du, and Junsong Yuan. "Optimal spatio-temporal path discovery for video event detection." IEEE Conference on Computer Vision and Pattern Recognition (CVPR), IEEE, 2011.
12. Hardoon, David R., Sandor Szedmak, and John Shawe-Taylor. "Canonical correlation analysis: An overview with application to learning methods." Neural computation 16.12 (2004): 2639-2664.
13. Kim, Kihwan, et al. "Motion fields to predict play evolution in dynamic sport scenes." Conference on Computer Vision and Pattern Recognition (CVPR), IEEE, 2010.
14. "2.3. Clustering¶." 2.3. Clustering-Scikit-Learn 0.19.1 Documentation, 18 Mar. 2018, scikit-learn.org/stable/modules/clustering.html.
15. Calinski, T., & Harabasz, J. "A dendrite method for cluster analysis". Communications in Statistics-theory and Methods 3: 1-27 (1974).

(2) Principal Aspects

Various embodiments of the invention include three "principal" aspects. The first is a system for prediction of adversary movements and, more specifically, to a system and method for control of a device based on explicit prediction of adversary movements. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
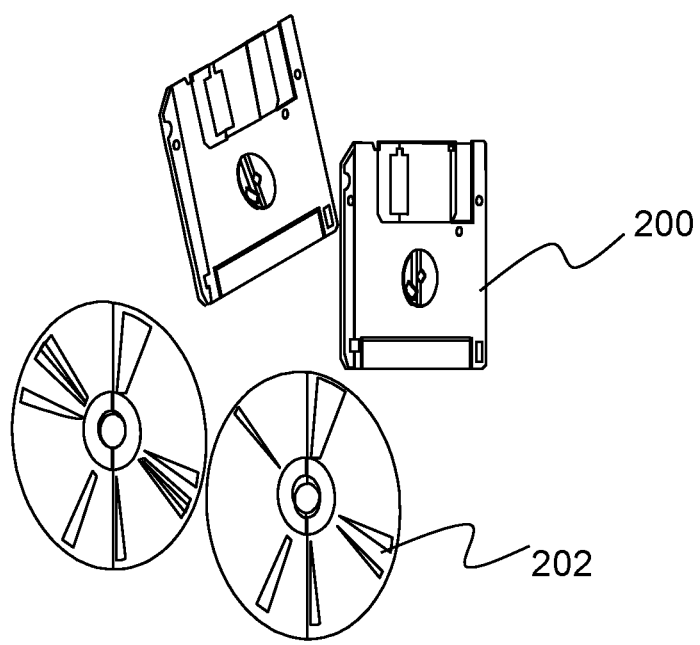
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

This disclosure describes systems and methods to explicitly predict multi-agent adversary movements. Such a task requires a good understanding of adversarial behavior, such as in sports. A new challenge in sports is to automatically provide tactical feedback to coaches, players, and/or spectators in real-time. Such high level analyses are typically complex, so team performance relies heavily on the skill set of coaches who can oversee the game from a wide perspective.

To overcome this challenge, a comprehensive representation of the team players and ball trajectory is created before applying a pattern recognition algorithm. In some embodiments, given the trajectories of both teams, canonical correlation analysis (CCA) [Hardoon et al. 2016, Kim et al. 2007] is used to learn or predict one team's tactical movements given the opposing team's movements.

Various techniques described in this disclosure automate the tactical analysis. Tactical analysis in multi-agent systems breaks down into two general tasks, feature representation and the pattern recognition paradigm. Both of these tasks go hand and hand. Even with good pattern recognition performance, overall performance of a system may still be poor if the relevant information is not encoded in the feature representation. This disclosure addresses both tasks and justifies the exemplary algorithms used for each task.

Figure 3:
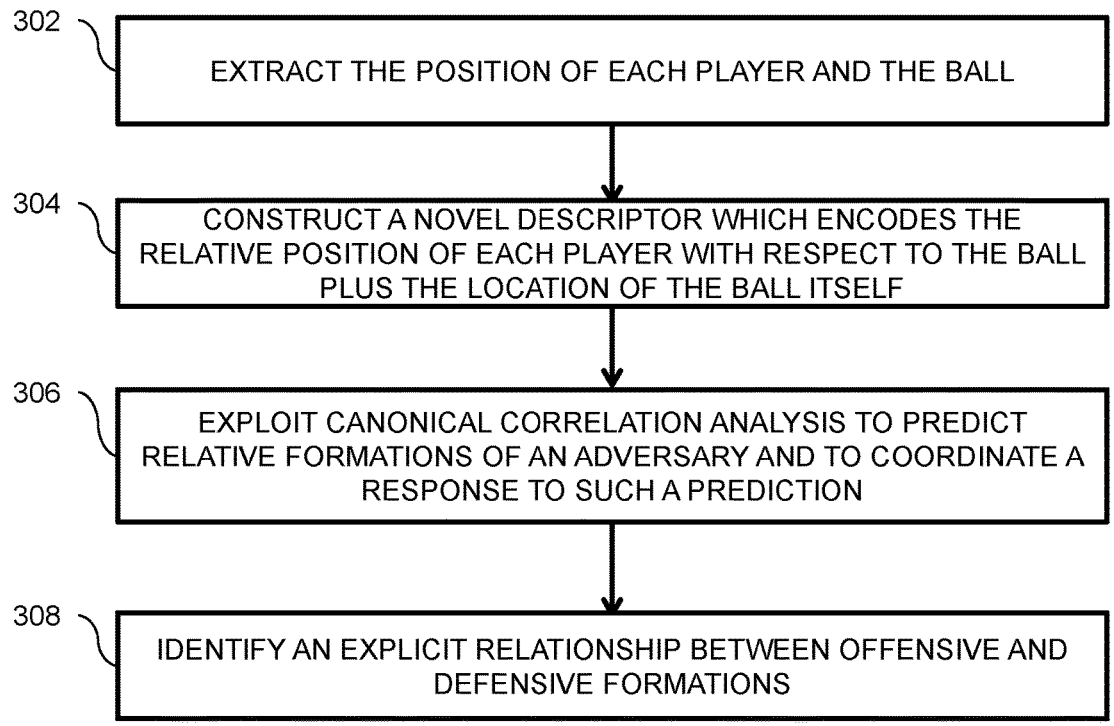
FIG. 3 is a flowchart illustrating operations for predicting relative formations of an adversary, according to various embodiments.

FIG. 3 is a flowchart illustrating operations for predicting relative formations of an adversary, according to an embodiment. In accordance with some embodiments, for the feature representation, the position of each player and the ball is extracted in operation 302. As a non-limiting example, a set of cameras (illustrated as element 420 in FIG. 4) can be positioned above or around the playing field to provide imagery for processing player positions according to methods known to those skilled in the art.

Then a novel descriptor is constructed which encodes the relative position of each player with respect to the ball plus the location of the ball itself in operation 304. This descriptor should be adequate for exploiting high level semantics such as "tactics" since it explicitly indicates the team formation in time. In addition, the extracted descriptors live in a linear space, in the sense that the linear combination of two descriptors is also a feasible descriptor. Hence, considering the linearity of descriptors, a canonical correlation analysis (CCA) may be exploited to predict relative formations of an adversary and coordinate a response to such a prediction (e.g., controlling a device, etc.) in operation 306. For example, pointing commands can be sent to video cameras to cause the video cameras to re-orient and/or focus on the predicted formation to improve the captured image and improve the post-play analysis graphics. With this technique, an explicit relationship between offensive and defensive formations can be learned in operation 308.

As a non-limiting example, the technique described herein was demonstrated using a basketball dataset (e.g., from the 2012-2013 NBA season). Experimenting with the basketball dataset, the system was able to predict adversary team player information (i.e. positions and movements) throughout the duration of a shot-clock with less than 87 cm mean square error (MSE) at each instance. The system described herein is the first to exploit such high-level semantics in sports.

A purpose of some embodiments of this disclosure is to exploit the high level semantics in adversary team behavior and to use this information to make a wide range of predictions. At the early stages of "machine-based" sport analytics, the main focus was to improve player re-identification [Bialkowski, Alina et al. 2013], tracking [Ali et al. 2008], and action and activity recognition [Bialkowski et al. 2013, Wang et al. 2011]. The progress in these applications combined with the recent advances in perception algorithms have paved the way for a more complex analysis of team tactics and strategies. However, the intricacy of such highly dynamic systems has led research toward simplifying assumptions, such as the independence between players [Pellegrini et al. 2009, Ali et al. 2008, Tran et al. 2011].

In contrast, some of the disclosed methods of the present disclosure take advantage of a novel linear descriptor (spatial descriptor that encodes each agent's movements throughout the shot-clocks) for the actions happening in a shot-clock, which embeds the information from all players and ball possession for both teams. In accordance with some embodiments, CCA is then used to predict the most probable formation that can counter the adversary's tactic based on the exported descriptors.

Various embodiments of the disclosed methods for modelling team behavior can be applied to a wide range of domains such as intelligence, surveillance, and reconnaissance (ISR), sport analytics, multi-agent systems, and prediction of tactical or strategic movements by persons, objects, and/or vehicles. This disclosure primarily focuses on sport analytics due to the real world nature of the datasets plus the fact that the sport analytics industry is rapidly growing in professional sports, but embodiments of this invention may be applied generally to prediction of adversary or other entity movements. Thus, although examples are provided with respect to sports, it should be understood that such examples are provided for illustrative purposes only and that the invention is not intended to be limited thereto. Further details are provided below.

(4) Specific Details of Various Embodiments

Various embodiments aim to create a rich representation of a multi-agent system and exploit their movement behavior. Specifically, consider the problem of player position estimation throughout the duration of each shot clock in the game of basketball. In order to optimize player positions in real-time, a good understanding of tactics and strategies from both teams is useful. Before beginning to describe the technique that makes predictions, the constraints in the basketball game are reviewed below.

The game of basketball consists of four quarters, and the duration of each quarter is 720 seconds (12 min) leading to 2880 seconds total in each NBA match. The clock countdown starts once a player from the team on the offense touches the ball. There are two processes of timekeeping in the game; first, the game clock and second, the shot clock. Once a team has possession they have up to 24 seconds to make the shot. The shot clock duration varies due to various reasons including rebounds, crossing over court boundaries, or simply due to shots being made. Once the shot clock resets the possession of the ball changes giving the opposing team a time window of 24 seconds to make their shot. In other adversarial contexts, different or additional constraints may apply, such as how quickly the persons or objects can move, the time duration, or other limitations.

Figure 4:
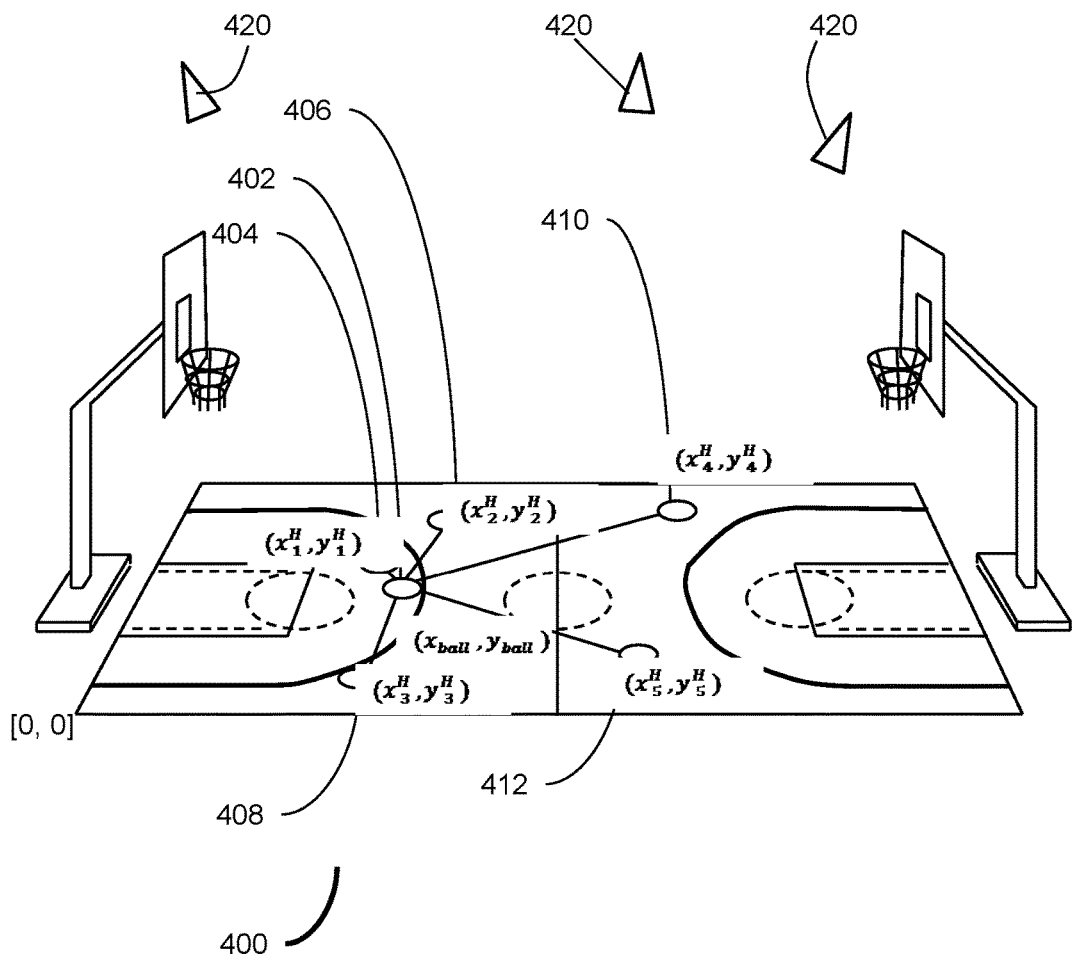
FIG. 4 is an exemplary visualization of player connections, according to various embodiments.

In FIG. 4, player connections are shown for the Home team in an exemplary visualization 400 (e.g., a visual image of a basketball court). In some embodiments, the court center is at the bottom left corner. When the feature is computed, this coordinate is transferred relative to the position of the ball 402 such that the ball 402 stays in the center of the feature coordinate system. In the implicit technique, as the shot clock evolves the star shaped figure (where there is a connection between each agent 404, 406, 408, 410, or 412 and the ball 402) continues to leave its trajectory on the image plane. In some embodiments of the Explicit method described below, each new instance within the shot clock corresponds to the sequence of relative distances from the ball in the image plane.

For some embodiments, the tactical analysis has been investigated during each complete duration between the two consecutive shot clock resets. Each duration between shot clock resets is referred to as an "event," and each event can be sampled into K discrete time steps. In the following subsections, the tactical representations are described first, and then an appropriate algorithm is discussed to exploit the tactical information.

Figure 5:
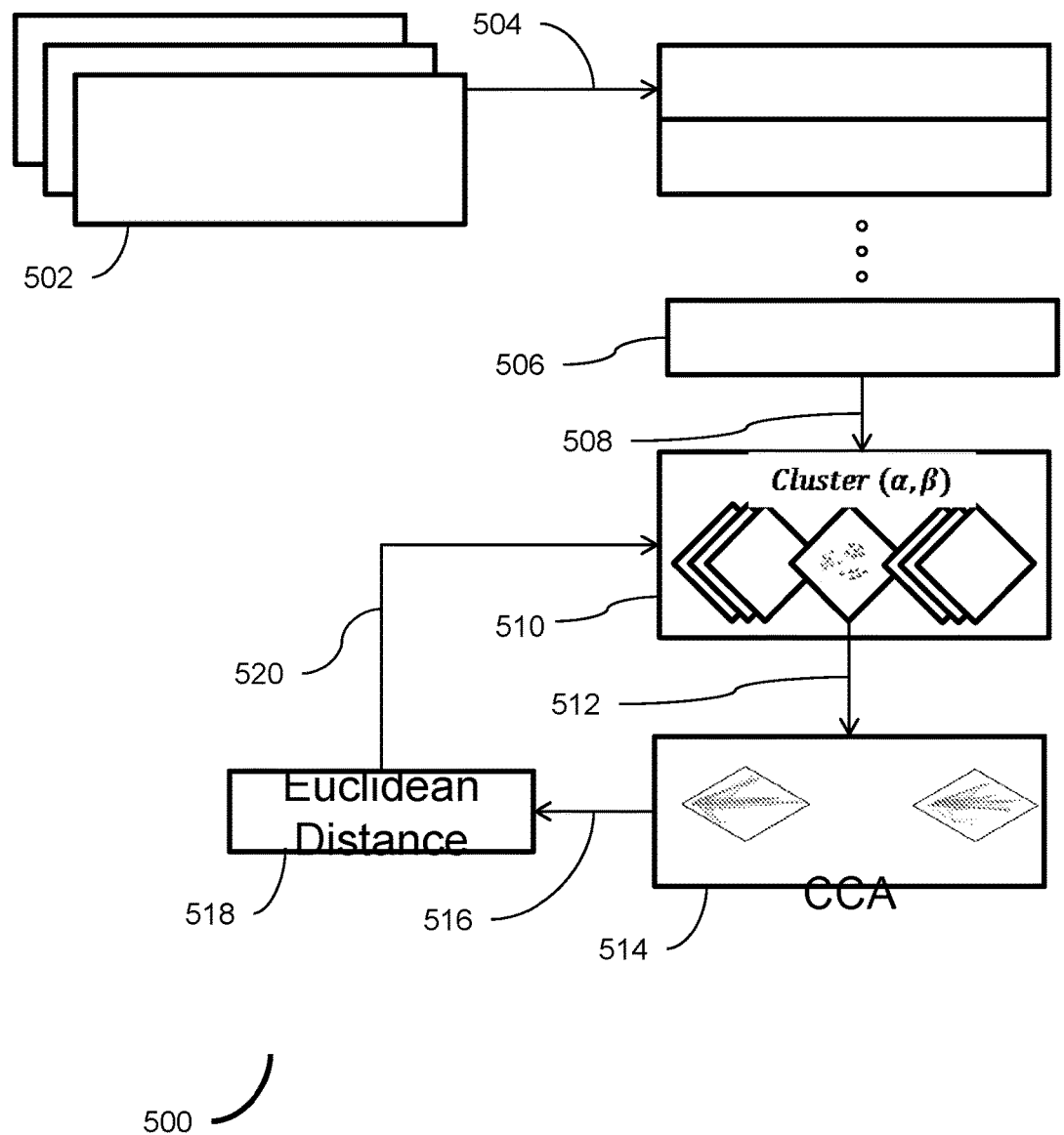
FIG. 5 is a flowchart for prediction of adversary movements, according to various embodiments.

(4.1) Explicit Tactical Analysis Based on Team Player and Ball Trajectories:

In some embodiments, in the first stage of the algorithm, the position of each player is computed with respect to the ball (FIG. 4) such that the offensive and defensive formations are encoded explicitly by the relative location of players with respect to the ball. There are many different ways of encoding features (e.g., features could be based on relative distance, relative heading or relative speed). The relational feature used by some embodiments of this disclosure can be used for tactical analysis, however the methods of this disclosure are not limited to this representation. Given this feature representation, canonical correlation analysis is then used to relate the offensive and defensive formations. FIG. 5 illustrates an explicit method flowchart 500 that describes the general framework. The feature representation stage (502, 506) is depicted by the explicit representation of the player/ball position 502 and the flattened equations 506. The pattern recognition stage (510, 512, 514, 516, 518, 520) is depicted by the clusters 510 with different methods and parameters, the CCA 514, and the determination of Euclidean distance 518.

Given the trajectory of the team formation with respect to the ball and the position of the ball itself, a k×12 matrix is created (e.g., multiple matrices are created with each corresponding to a particular time period such as a shot clock duration) where each row contains the x and y coordinates of 5 players and the ball (e.g., a feature representation is generated by forming a matrix based on the relative positions of the multiple objects of interest). This Matrix is then flattened (each row of the matrix is concatenated to form a single vector) and clustered with a greedy search over different clustering algorithms (such as K-Means, Affinity-Prop) and a wide range of bandwidths. Using the centroid of each cluster the CCA is trained for different classes of tactics.

In some embodiments, an explicit representation of player positions relative to the ball are used to form a set of K×12 matrices 502. Each row represents positions that occur within a period of a shot-clock. For example, a row may include the following:

$$[x_1^{h,1} - x_{ball}^1, y_1^{h,1} - y_{ball}^1, \ldots, x_5^{h,1} - x_{ball}^1, y_{51}^{h,1} - y_{ball}^1,$$
$$x_1^{v,1} - x_{ball}^1, y_1^{v,1} - y_{ball}^1, \ldots x_5^{v,1} - x_{ball}^1, y_5^{v,1} - y_{ball}^1].$$

Equation 1

In operation 504, the matrices 502 are flattened, resulting in 1×12K vectors 506, hence, 502 is the collection of all spatial positions during the shot clock and 506 shows the vectors per snapshot.

In operation 508, the vectors 506 are provided for forming clusters 510 (e.g. KMeans, see Literature Reference No. 14) based on feedback via operation 520 from the output of the CCA 514 analysis. To clarify, after choosing each clustering parameter, the resulting predictions are evaluated using CCA. By performing a greedy search, a set of parameters can be found that leads to better predictions.

In operation 512, the clusters 510 are provided for CCA 514 analysis to generate predictions of adversary movement.

In operation 516, the output of the CCA 514 analysis (e.g., with respect to the prediction of adversary movements) is used to generate a Euclidean Distance 518 (e.g., in a spatial domain, such as a basketball court).

In operation 520, the Euclidean Distance 518 is used to affect the formation of the clusters 510 (e.g., in the spatial domain, such as in a basketball court). Depending on the clustering parameters (e.g. k in KMeans), different centroids result. Given different centroids, different CCA components are derived and hence different performance on agents' localizations. Therefore, operation 520 examines all these clustering parameters to find the best one that lead s to less Euclidian error.

(4.2) Offensive and Defensive Relationship with Canonical Correlation Analysis:

In the approach of this disclosure, the tactical formations of the "home" and "adversary" teams during a shot clock (e.g., a given time period) are embedded into two vectors, namely $h$ and $v$. Let N be the total number of tactical formations during the shot clocks in various games such that $h_n \in R^M$ and $v_n \in R^M$, where M is the fixed number of samples observed during each shot clock. N is fixed and it is independent of the shot clock duration. N is a fixed number of samples extracted from the duration of a shot clock.

A goal of this disclosure is to find the relationship between the "home" and "adversary" formations. Formally, for a given formation of the home team, $h$ it is desirable to find the most probable formation of the adversary, $v$. This can be achieved via CCA that seeks a shared embedding for $h$ and v such that the embedded representations for the same shot clock lay close to each other. In other words, CCA maximizes the following objective function:

$$CCA_{comp} = \arg\max_{u,w} \frac{\sum_{n=1}^{N}(u^T h_n)(v_n^T w)}{\sqrt{\sum_{n=1}^{N} u^T h_n h_n^T u}\sqrt{\sum_{n=1}^{N} w^T v_n v_n^T w}} =$$

$$\arg\max_{u,w} \frac{u^T C_{hv} w}{\sqrt{u^T C_{hh} u}\sqrt{w^T C_{vv} w}}.$$

Equation 2

Where u and w are the CCA components that project the data onto the shared embedding and $C_{hh}$, $C_{vv}$, $C_{hv}$ are the covariance matrices.

For further understanding, FIG. 6 includes an algorithm (Algorithm 1) for some embodiments and that describes more details at various possible stages of the disclosed process. In the first stage, the feature representation is enriched with relational features with respect to the position of the ball 402. Although the methods and systems of this disclosure are not limited to this convention, the relational features tend to outperform independent agent-based representation. In the second stage, noise is eliminated by selecting the centroid of each cluster to be used in the final stage, which is to learn the relationship between movement patterns of each team.

For some embodiments, the algorithm depicted in FIG. 6 is the overall algorithm for explicit tactical analysis. In an operation, the relational features are computed (e.g., using parts 1 and 2 of FIG. 6). Next, the noise is reduced by selecting the centroids to be used at a subsequent step (e.g., parts 3 and 4 of FIG. 6) which is relating the adversary team movements with the home team movements.

Through CCA, it was demonstrated that there are significant correlations between the offensive and the corresponding defensive formations within each shot clock. The algorithm of FIG. 6 summarizes an approach of this disclosure for explicit tactical analysis in accordance with some embodiments.

In this section, details of an implementation are described and results are shown. First, the dataset will be described. Next, this disclosure goes over feature representation, followed by a discussion of the results.

(4.3) Dataset

The dataset is obtained from STATS SportsVU tracking data for the 2012-2013 NBA season. SportVU dataset is obtained from visual data collected from six cameras installed on top of basketball arenas. The available information contains players" position, ball position, team IDs and player IDs, game clock, shot clock, quarter indication and more for 663 games across 13 NBA teams with the frequency of 25 frame per second. In the experiments player and ball position, shot clocks, and the score are used.

(4.4) Feature Representation

The feature extraction plays a critical role in a sense that it should contain high level semantics encoded in each sample. Given the importance of ball position and its relative distance and orientation with respect to each player the feature representation is constructed such that it contains relative distance and orientation of each player with respect to the ball. The assumption here is that a team's tactics are revealed over the entire duration of a shot clock (which is a maximum of 24 second). Each feature is in a form of a 2D matrix. The number of rows correspond to the number of shot clock periods and the columns of the matrix correspond to relative position of the players (e.g., players 404, 406, 408, 410, 412) with respect to the ball 402 such that x, y which are respectively the horizontal and the vertical distance at each instance. In other embodiments, the columns may show relative position with respect to other objects or persons, such as a key player, a center of the court, basket locations, etc.

(4.5) Tactical Analysis

Referring back to the feature representation for trajectory-based tactical analysis, notice that the formation of each team (offensive or defensive) was expressed with a spatio-temporal information of players throughout each shot clock. Each tactical data point is then expressed with a set of K vectors each with a size of [1×12] i.e. q=[$x_1$, $y_1$, ... $x_5$, $y_5$, $x_{ball}$, $y_{ball}$]. The parameter K was set to 10 in experiments which means that despite the length of an event 10 equally spaced samples are taken to encode the formation. Therefore, for each event (complete duration of a shot clock) a pair including an offensive vector with its corresponding defensive vector (e.g., generating a pair of tactical feature vectors) is obtained.

Figure 7:
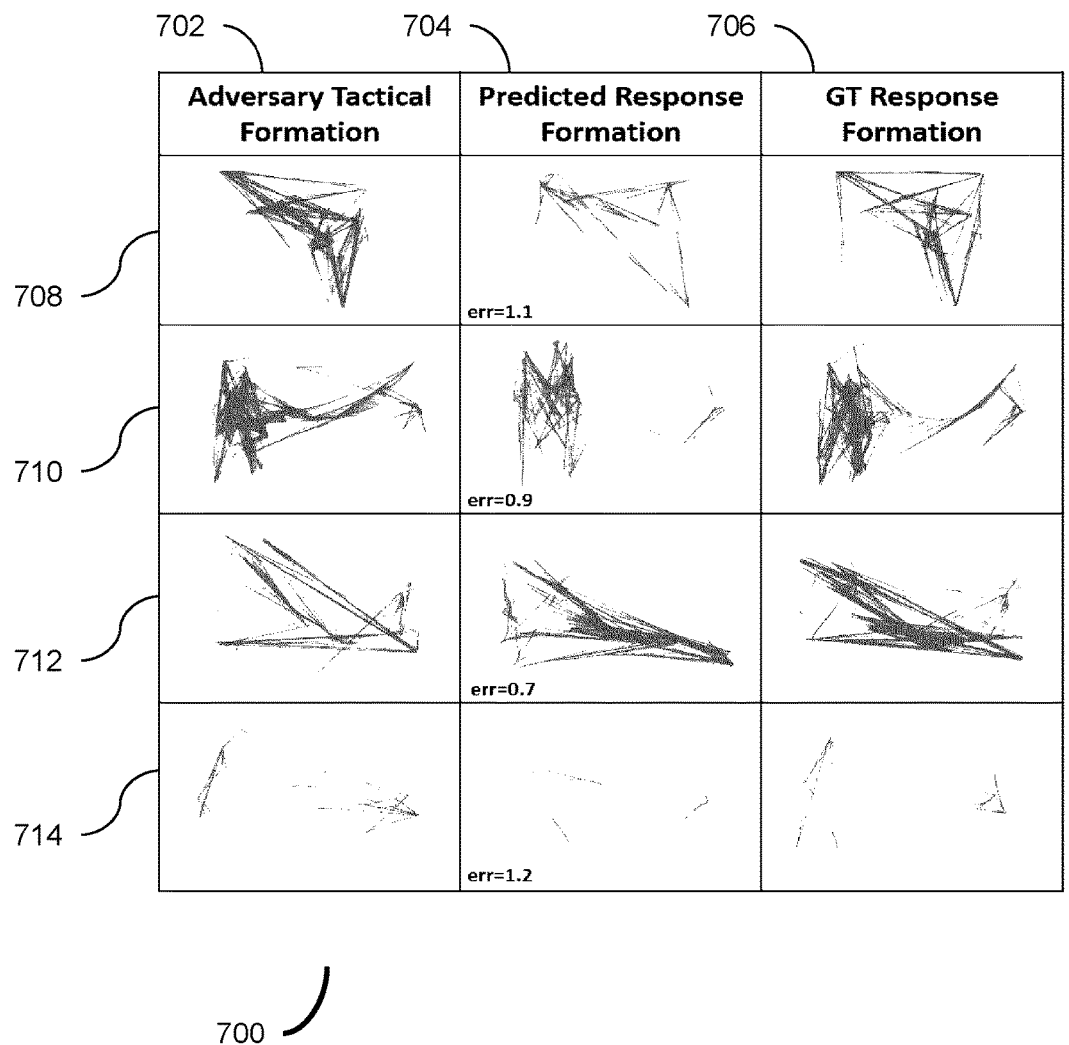
FIG. 7 is an illustration of an algorithm used for tactical analysis, according to various embodiments.

FIG. 7 illustrates exemplary results for tactical prediction with CCA. The first column 702 contains the adversary movements throughout the entire duration of the shot clock. The middle column 704 shows the prediction of the response movement and the third column 706 shows the ground truth. Various examples may be found in rows 708, 710, 712, and 714 with corresponding error values (e.g., Euclidean errors).

In an experiment K-fold cross validation was used for training and testing. At the training stage each pair of corresponding formations are used to train CCA parameters. During testing, after observing the adversary movements, the CCA is run to make a prediction of player movements during the shot clock. FIG. 7 shows exemplary predictions compared with the ground truth. Note that the visualization is obtained from finding the nearest neighbor to CCA's prediction in the training data. As can be seen, the predicted formations are very similar to that of the ground truth.

(4.6) Control of a Device

Figure 8:
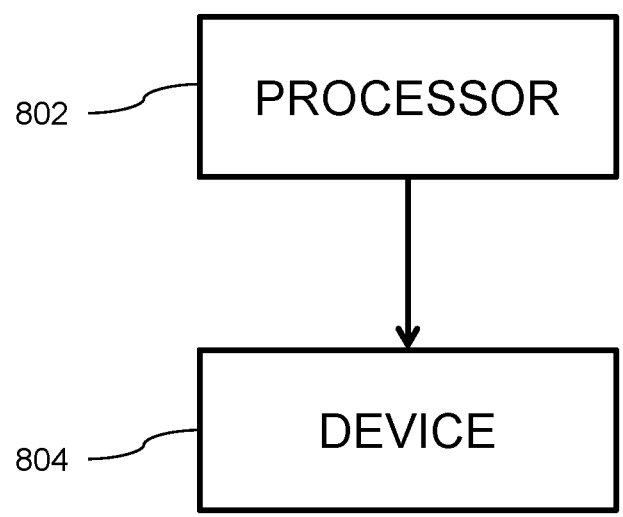
FIG. 8 is a block diagram depicting control of a device, according to various embodiments.

As shown in FIG. 8, a processor 802 (e.g., a processor 104) may be used to control a device 804 (e.g., a mobile device display, a virtual reality display, an augmented reality display, a computer monitor, a motor, a machine, a drone, a camera, etc.) based on the prediction of adversary movements described above. The control of the device 808 may be used to transform the prediction data regarding adversary movements into a still image or video representing the predicted movements. For example, the predicted movements may be shown on a representation of the area where movement is predicted to occur, such on the court shown in FIG. 4. In other embodiments, the device 808 may be controlled to cause the device to move or otherwise initiate a physical action based on the prediction. As noted above and as yet another example, pointing commands can be sent to video cameras to cause the video cameras to re-orient (i.e., turn via actuators) and/or focus on the area where movement is predicted to occur to improve the captured image and improve the post-play analysis graphics.

In some embodiments, an image representing predicted movements may be overlaid on top of a view of a real-world environment. For example, a player, coach, or spectator may be shown an image representing the predicted movement or predicted future location of members of an opposing team based on their current formation. The image (e.g., circles representing predicted positions) may be overlaid on top of a view of the basketball court.

In some embodiments, a drone may be controlled to move to an area where predicted events are going to occur or where such predicted events can be viewed. In yet some other embodiments, a camera may be controlled to orient towards where predicted events are going to occur. In other words, actuators or motors are activated to cause the camera (or sensor) or other device to move and change its field of view (e.g., orientation) to encompass or otherwise be directed towards the location where the predicted events are going to occur.

Figure 9:
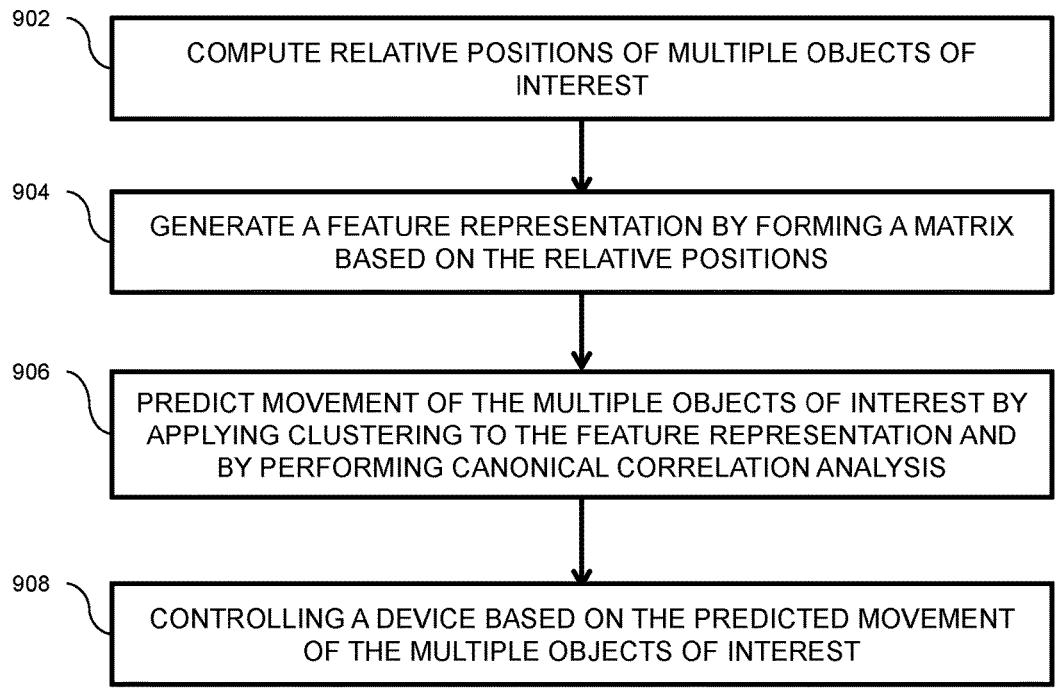
FIG. 9 a flowchart illustrating operations for predicting movement of multiple objects of interest, according to various embodiments.

FIG. 9 is a flowchart illustrating operations for predicting multiple objects of interest, according to an embodiment. In operation 902, relative positions of multiple objects of interest are computed. In operation 904, a feature representation is generated by forming a matrix based on the relative positions. In operation 906, movement of the multiple objects of interest is predicted by applying clustering to the feature representation and by performing canonical correlation analysis. In operation 908, a device is controlled based on the predicted movement of the multiple objects of interest. For example, the system can collect images of play and compute the relative positions of players on the playing field (e.g., basketball court, football field, etc.). The system then predicts the next position of the players and the ball and can reposition or otherwise reorient (and re-focus as needed) the cameras to catch the action at the predicted location.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for predicting movements, the system comprising:
   one or more processors and a memory, the memory being a non-transitory computer-readable medium having executable instructions encoded thereon, such that upon execution of the instructions, the one or more processors perform operations of:
   computing relative positions of multiple objects of interest;
   generating a feature representation by forming a matrix based on the relative positions;
   predicting movement of the multiple objects of interest by applying clustering to the feature representation and by performing canonical correlation analysis; and
   controlling a device based on the predicted movement of the multiple objects of interest.

2. The system of claim 1, wherein the device includes a display.

3. The system of claim 1, wherein the device includes a motor.

4. The system of claim 1, wherein the one or more processors further perform the operation of generating pairs of tactical feature vectors.

5. The system of claim 4, wherein the canonical correlation analysis is performed using the pairs of tactical feature vectors.

6. The system as set forth in claim 1, wherein controlling the device includes causing a camera to orient based on the predicted movement.

7. The system as set forth in claim 1, wherein the canonical correlation analysis (CCA) maximizes the following objective function:

$$CCA_{comp} = \arg\max_{u,w} \frac{\sum_{n=1}^{N}(u^T h_n)(v_n^T w)}{\sqrt{\sum_{n=1}^{N} u^T h_n h_n^T u} \sqrt{\sum_{n=1}^{N} w^T v_n v_n^T w}} = \arg\max_{u,w} \frac{u^T C_{hv} w}{\sqrt{u^T C_{hh} u} \sqrt{w^T C_{vv} w}}$$

wherein u and w are CCA components that project data onto a shared embedding and $C_{hh}$, $C_{vv}$, $C_{hv}$ are covariance matrices, the tactical formations of a home team and an adversary team are embedded into vectors h and v, respectively, N is the total number of tactical formations during a given time period, and the multiple objects of interest are the members of the adversary team.

8. A computer program product for predicting movements, the computer program product comprising:
   a non-transitory computer-readable medium having executable instructions encoded thereon, such that upon execution of the instructions by one or more processors, the one or more processors perform operations of:
   computing relative positions of multiple objects of interest;
   generating a feature representation by forming a matrix based on the relative positions;
   predicting movement of the multiple objects of interest by applying clustering to the feature representation and canonical correlation analysis; and
   controlling a device based on the predicted movement of the multiple objects of interest.

9. The computer program product of claim 8, wherein the device includes a display.

10. The computer program product of claim 8, wherein the device includes a motor.

11. The computer program product of claim 8, wherein the one or more processors further perform the operation of generating pairs of tactical feature vectors.

12. The computer program product of claim 11, wherein the canonical correlation analysis is performed using the pairs of tactical feature vectors.

13. The computer program product as set forth in claim 8, wherein controlling the device includes causing a camera to orient based on the predicted movement.

14. The computer program product as set forth in claim 8, wherein the canonical correlation analysis (CCA) maximizes the following objective function:

$$CCA_{comp} = \arg\max_{u,w} \frac{\sum_{n=1}^{N}(u^T h_n)(v_n^T w)}{\sqrt{\sum_{n=1}^{N} u^T h_n h_n^T u} \sqrt{\sum_{n=1}^{N} w^T v_n v_n^T w}} = \arg\max_{u,w} \frac{u^T C_{hv} w}{\sqrt{u^T C_{hh} u} \sqrt{w^T C_{vv} w}}$$

wherein u and w are CCA components that project data onto a shared embedding and $C_{hh}$, $C_{vv}$, $C_{hv}$ are covariance matrices, the tactical formations of a home team and an adversary team are embedded into vectors h and v, respectively, N is the total number of tactical formations during a given time period, and the multiple objects of interest are the members of the adversary team.

15. A computer implemented method for predicting movements, the method comprising an act of:
   causing one or more processors to execute instructions encoded on a non-transitory computer-readable medium, such that upon execution, the one or more processors perform operations of:
   computing relative positions of multiple objects of interest;
   generating a feature representation by forming a matrix based on the relative positions;

predicting movement of the multiple objects of interest by applying clustering to the feature representation and canonical correlation analysis; and controlling a device based on the predicted movement of the multiple objects of interest.

16. The method of claim 15, wherein the device includes a display.

17. The method of claim 15, wherein the device includes a motor.

18. The method of claim 15, wherein the one or more processors further perform the operation of generating pairs of tactical feature vectors.

19. The method of claim 18, wherein the canonical correlation analysis is performed using the pairs of tactical feature vectors.

20. The method as set forth in claim 15, wherein controlling the device includes causing a camera to orient based on the predicted movement.

21. The method as set forth in claim 15, wherein the canonical correlation analysis (CCA) maximizes the following objective function:

$$CCA_{comp} = \arg\max_{u,w} \frac{\sum_{n=1}^{N}(u^T h_n)(v_n^T w)}{\sqrt{\sum_{n=1}^{N} u^T h_n h_n^T u} \sqrt{\sum_{n=1}^{N} w^T v_n v_n^T w}} = \arg\max_{u,w} \frac{u^T C_{hv} w}{\sqrt{u^T C_{hh} u} \sqrt{w^T C_{vv} w}}$$

wherein u and w are CCA components that project data onto a shared embedding and $C_{hh}$, $C_{vv}$, $C_{hv}$ are covariance matrices, the tactical formations of a home team and an adversary team are embedded into vectors h and v, respectively, N is the total number of tactical formations during a given time period, and the multiple objects of interest are the members of the adversary team.

* * * * *